July 16, 1940.                C. O. MARSHALL ET AL                2,208,556
                           PERCENTAGE INDICATING SCALE
                              Filed Aug. 25, 1938            4 Sheets-Sheet 1
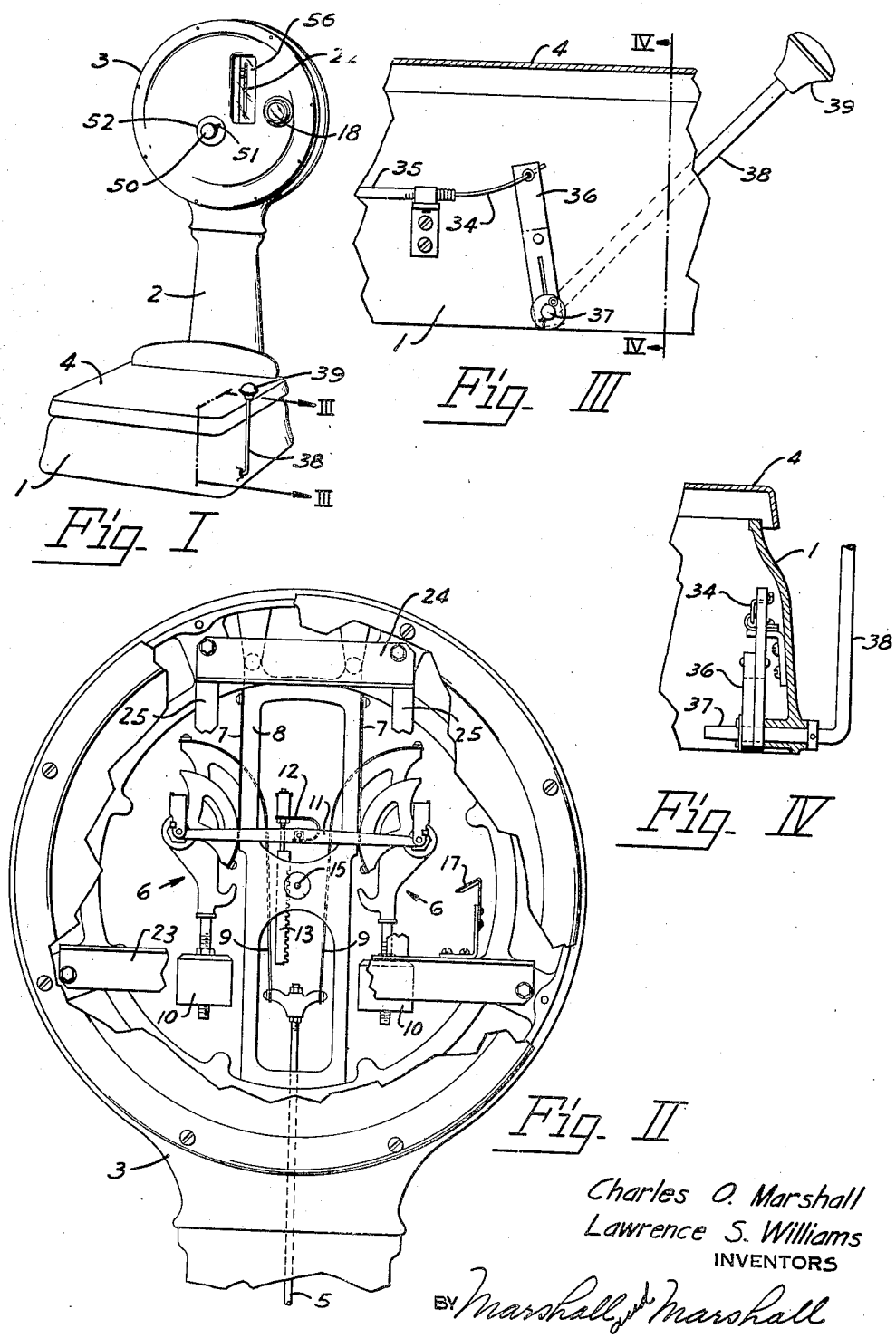
Charles O. Marshall
Lawrence S. Williams
INVENTORS
BY Marshall & Marshall
ATTORNEYS July 16, 1940.  C. O. MARSHALL ET AL  2,208,556
PERCENTAGE INDICATING SCALE
Filed Aug. 25, 1938   4 Sheets-Sheet 2
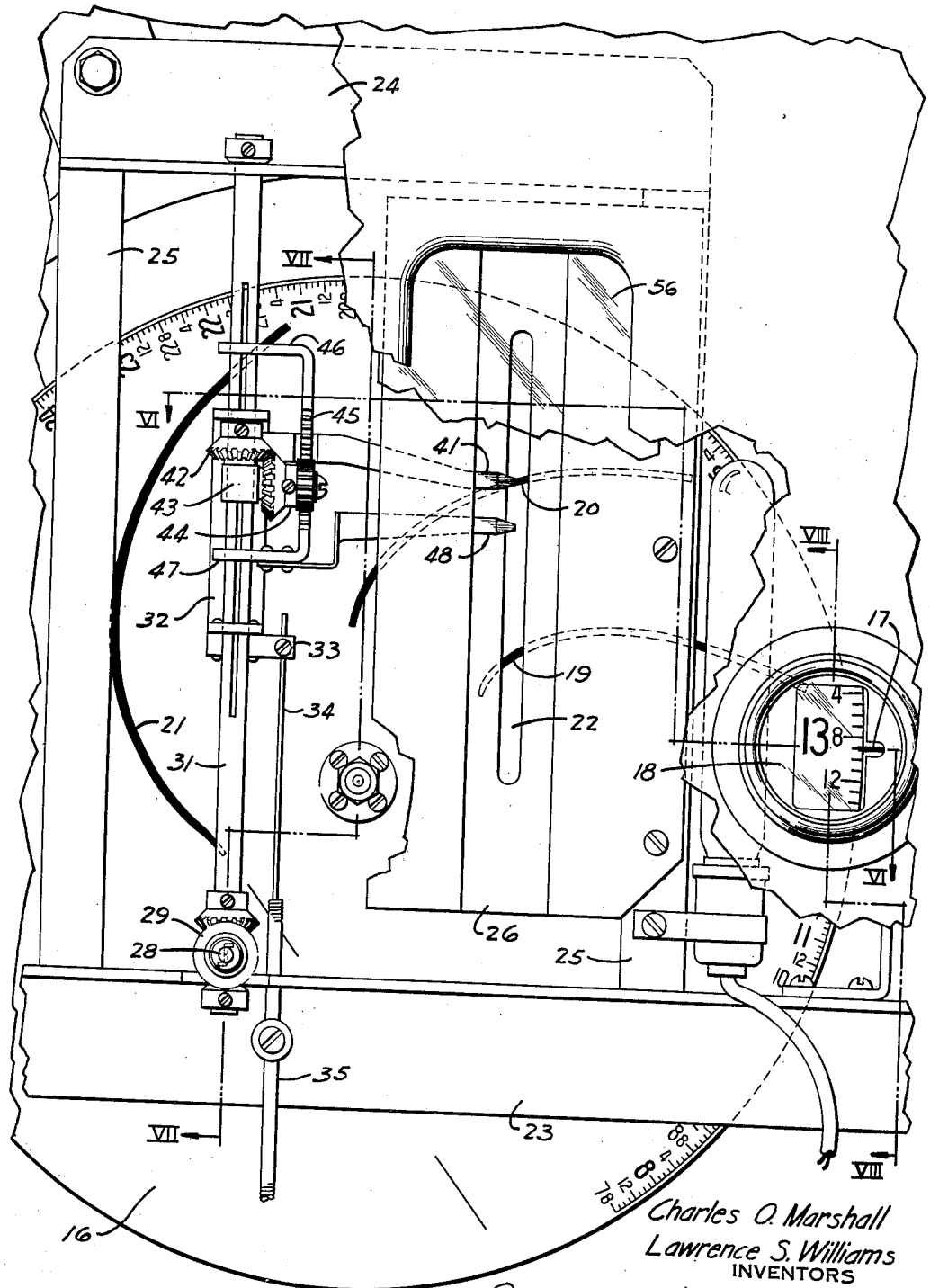
Fig. V
Charles O. Marshall
Lawrence S. Williams
INVENTORS
BY Marshall & Marshall
ATTORNEYS July 16, 1940.    C. O. MARSHALL ET AL    2,208,556
PERCENTAGE INDICATING SCALE
Filed Aug. 25, 1938    4 Sheets-Sheet 3
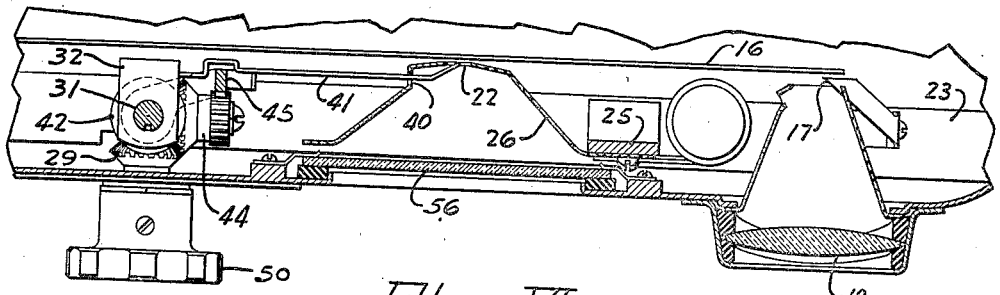
Fig. VI
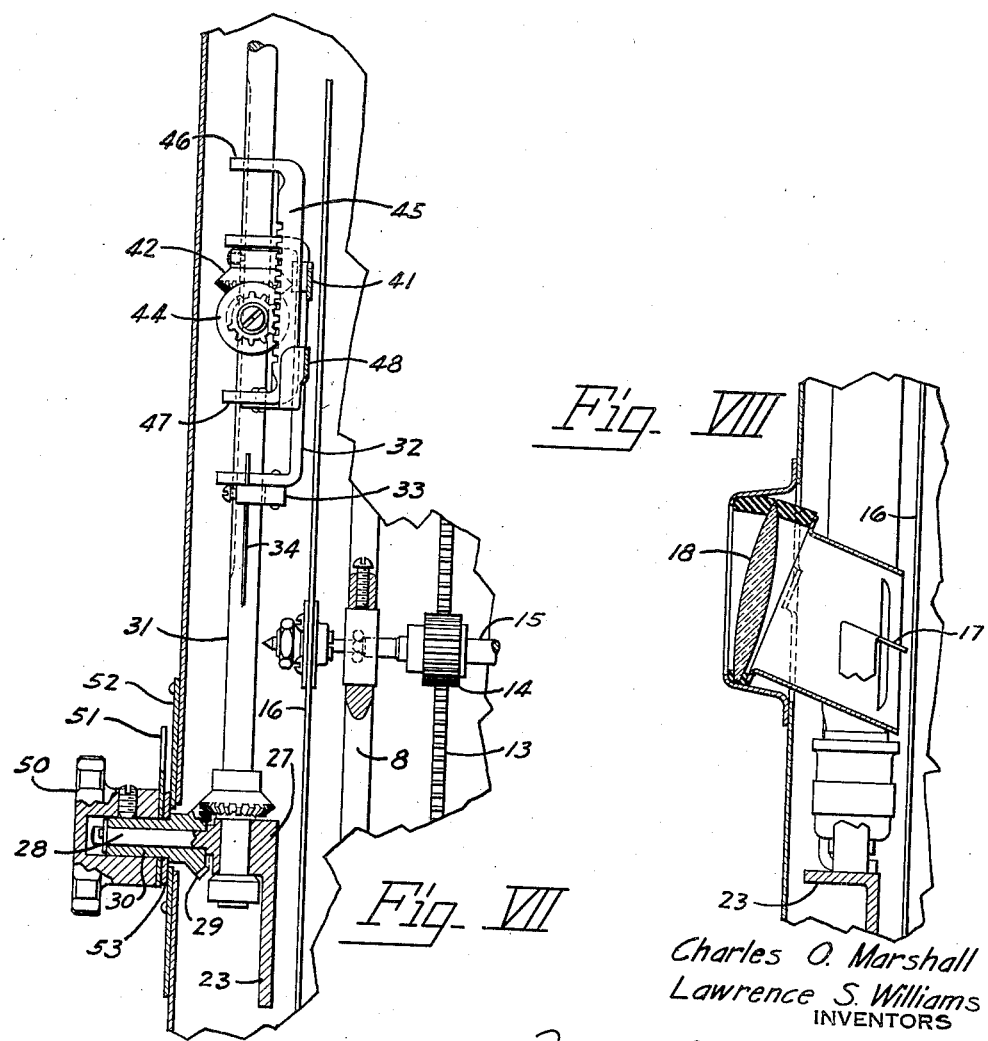
Fig. VII    Fig. VIII
Charles O. Marshall
Lawrence S. Williams
INVENTORS
BY Marshall & Marshall
ATTORNEYS July 16, 1940.                  C. O. MARSHALL ET AL                    2,208,556
                              PERCENTAGE INDICATING SCALE
                              Filed Aug. 25, 1938         4 Sheets-Sheet 4
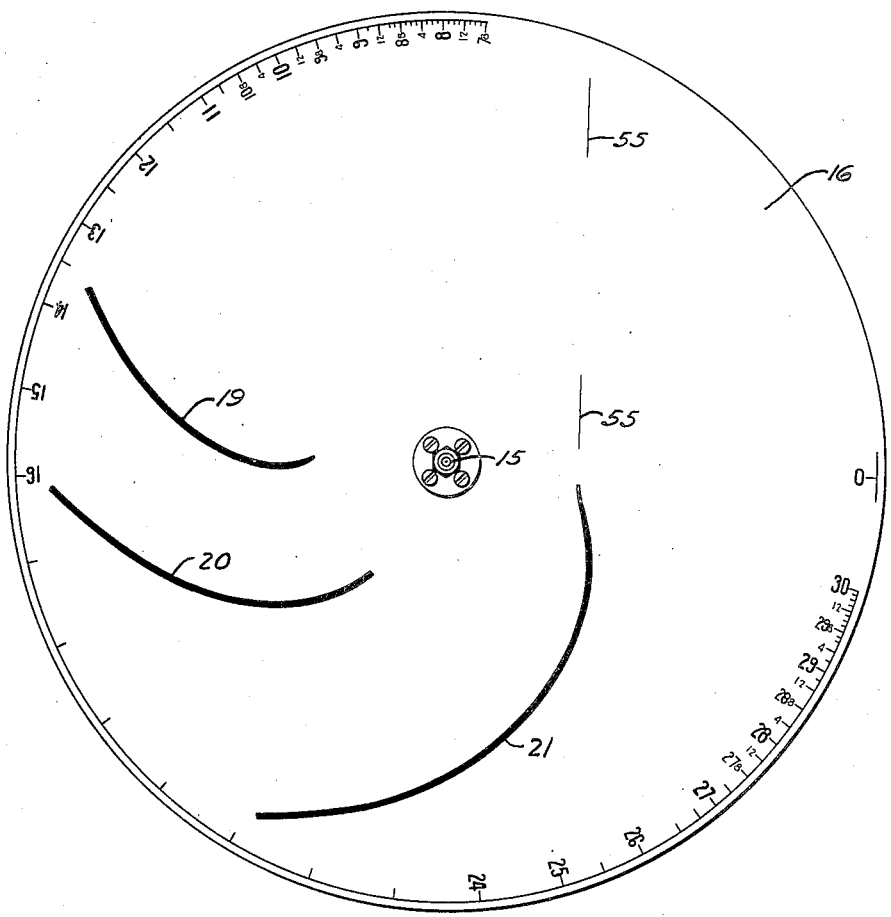
Fig. X
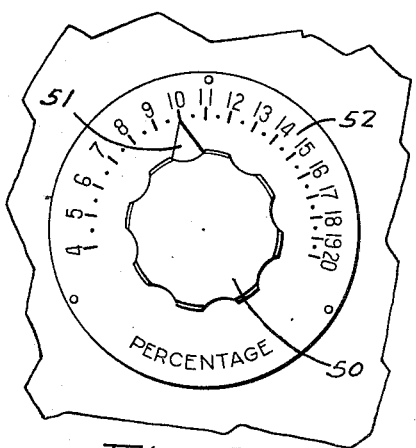
Fig. IX
Charles O. Marshall
Lawrence S. Williams
INVENTORS
BY Marshall & Marshall
ATTORNEYS

Patented July 16, 1940

2,208,556

UNITED STATES PATENT OFFICE 2,208,556

PERCENTAGE INDICATING SCALE

Charles O. Marshall and Lawrence S. Williams, Toledo, Ohio, assignors to Toledo Scale Company, a corporation of New Jersey Application August 25, 1938, Serial No. 226,720

10 Claims. (Cl. 265—29)

This invention relates to percentage indicating scales, and particularly to scales employed to indicate when the weight of a commodity being processed has been varied by a predetermined percentage. For example, when hams are processed by injecting preservative and flavoring brine into the blood vessels, it is important that the quantity of brine injected into each ham be proportional to the weight of the ham. Each ham is weighted before injection and then while it is supported upon an automatic scale, the brine is forced through a flexible tube into the blood vessels until the weight of the ham has increased by the required percentage. The percentage of weight to be added depends upon the curing procedure employed by the processor. It may be eight per cent for one lot or quality of hams and fourteen per cent for another lot or quality.

It is an object of this invention to provide a device which will enable the user to add a predetermined percentage of weight to a commodity with speed and accuracy.

A further object is to provide such a device which is capable of use with a minimum of mental effort.

A further object is to equip such device for ease of visual and manual operation; and Still a further object is to incorporate such a device with automatic weighing mechanism of standard commercial construction.

Other objects and advantages will be apparent from the following description, in which reference is had to the accompanying drawings illustrating a preferred embodiment of our invention and wherein similar reference numerals designate similar parts throughout the several views.

In the drawings:

Fig. I is a view in perspective of a weighing scale embodying the invention;

Fig. II is an enlarged front elevational view showing the automatic load-counterbalancing mechanism of the scale, parts of the framework and casing being broken away;

Fig. III is an enlarged fragmentary view, partly in section, taken from the position indicated by the line III—III of Fig. I;

Fig. IV is a fragmentary sectional view taken on the line IV—IV of Fig. III;

Fig. V is a further enlarged fragmentary front elevational view showing the indicating mechanism of the scale;

Fig. VI is a fragmentary plan view in section along the line VI—VI of Fig. V;

Fig. VII is a fragmentary side elevational view in section along the line VII—VII of Fig. V;

Fig. VIII is a fragmentary side elevational view along the line VIII—VIII of Fig. V;

Fig. IX is a fragmentary front elevational view showing a percentage setting knob and dial of the scale illustrated in Fig. I; and Fig. X is a front elevational view of a revoluble indicator disk employed in the illustrated embodiment of the invention.

Referring to the drawings in detail, the scale frame consists principally of a base 1 having an upright column 2 at its rear end, the column 2 being surmounted by a flat, round casing 3. The commodity-receiver of the scale is a platform 4 which is supported, in a well-known manner, upon platform lever mechanism (not shown), the platform lever mechanism being connected by means of a rod 5 to automatic load-counterbalancing mechanism located within the casing 3.

The automatic load-counterbalancing mechanism consists of a pair of pendulums 6 supported by metallic ribbons 7 from an upright frame member 8 and connected by metallic ribbons 9 to the upper end of the rod 5. When a load is placed upon the platform 4 the pendulums 6 roll upwardly upon the ribbons 7 and their bobs 10 swing outwardly until the load on the platform is counterbalanced.

Pivoted to both pendulums 6, at points which move straight up during the influence of a load, is a light frame 11, and connected by means of a shock absorbing resilient strip 12 to the light frame 11 is a rack 13. The rack 13 meshes with a pinion 14 fixed upon a shaft 15 which is rotatably mounted, by means of ball bearings, in the frame member 8. When the pendulums are moved by a load on the platform 4 the shaft 15 is turned through an angle proportional to the weight of the load.

The mechanism so far described is that of a well-known type of scale. Therefore, it is illustrated and described herein only in such particularity as to make the instant invention and its relation to the known mechanism readily understandable.

Fixed to the shaft 15 is a disk 16, preferably of aluminum alloy or similar light material. When a load is placed upon the platform 4 the disk 16 turns with the shaft 15 through an angle proportional to the weight of the load. If desired, the disk may be provided along its outer edge with a series of graduations and figures for cooperation with a stationary index 17 to indicate simple weight, and the simple weight indication may be read through a magnifying lens 18 suitably mounted in the front wall of the casing 3.

Inscribed upon the disk 16 are curved lines 19, 20 and 21 which pass in overlapping sequence behind a vertical slot 22 when the chart is turned clockwise by a load on the platform 4. Fixed within the casing 3 and positioned forwardly of the disk 16 is a subframe constructed of a lower horizontal bar 23 of angle section, an upper horizontal bar 24 of angle section and two flat vertical bars 25, and fixed to the right vertical bar 25 is a trough-shaped member 26 having the vertical slot 22 along the deepest part of its trough. The trough-shaped member 26 is located behind an opening in the front wall of the casing 3 and together with the wall forms a mask having a slot within which short segments of the curves 19, 20 and 21 are visible.

The curved line 19 is so located and so shaped that its outer end appears at the upper end of the slot 22 when the load on the platform weighs seven and one-half pounds, and if the load be increased the portion of the curve visible through the slot appears to move downwardly, until, when the load is increased to fifteen pounds, the inner end of the curved line 19 is visible at the lower end of the slot. The distance that the visible portion of the curve appears to move downwardly under the influence of an increase in load is proportional to the percentage of increase. If the load on the scale be increased from eight pounds to nine pounds (twelve and one-half per cent), the visible portion of the line will appear to descend through the same distance as that through which it would appear to descend if the load were increased from twelve pounds to thirteen and one-half pounds (twelve and one-half per cent).

The outer end of the curved line 20 appears at the upper end of the slot 22 when the load on the platform is ten pounds, and portions of the curved line 20 are visible with the loads on the platform ranging from ten pounds to twenty pounds. The visible portions of the curved line 20 also appear to descend distances proportional to percentages of increase in the weights of loads on the platform. Whether a load be increased from fifteen pounds to sixteen and one-half pounds (ten per cent) or be increased from eighteen pounds to nineteen and eight-tenths pounds (ten percent), the distances through which the visible portions of the curved line appear to descend will be the same.

The outer end of the curved line 21 appears at the upper end of the slot 22 when the load on the scale platform weighs fifteen pounds, and the visible portions of the curved line 21 appear to descend along the slot as loading increases, distances through which the visible portions of the line 21 appear to descend also being dependent upon percentages of increase in loads. Two pounds added to a load of twenty pounds will cause the visible portions of the line 21 to appear to descend as far as visible portions of the line will be caused to appear to descend by the addition of two and one-half pounds to a twenty-five pound load. With a capacity load on the scale, the inner end of the curved line 21 will be at the lower end of the slot 22.

The lower horizontal bar 23 is provided with a boss 27, from which a fixed pintle 28 projects forwardly through an opening in the front wall of the casing 3. A beveled pinion 29, having a long forwardly extending hub 30, is rotatably mounted on the pintle 28 and meshes with a beveled pinion fixed upon a vertical rotatable shaft 31 the lower end of which is journaled in the boss 27 and the upper end of which is journaled in the upper horizontal bar 24.

Slidably mounted upon the vertical shaft 31 is a yoke 32 having a small bracket 33 fixed to its lower end. A wire 34 is clamped at one end to the bracket 33 and extends within a flexible tube 35 downwardly through the column 2 and forwardly along the inside of the right wall of the base 1, the other end of the wire being connected to an arm 36 which is clamped to a crankshaft 37.

The crankshaft 37 is rockingly mounted adjacent the lower right front corner of the base and extends from the inside to the outside thereof, where it is bent to form a crank 38 which terminates in a handle 39. By moving the handle 39 forwardly or backwardly, the yoke 32 may be slid upwardly or downwardly on the rotatable shaft 31. Fixed to the yoke 32 and extending laterally through the narrow vertical slit 40 in the trough-shaped member 26 is an upper pointer 41, the indicating end of which is visible and projects into the slot 22. The pointer 41 being confined between the sides of the slit 40, the yoke 32 is prevented from turning about the axis of the vertical shaft 31.

A beveled pinion 42 is slidably splined to the vertical shaft 31 and is rotatably confined between the upper arm of the yoke 32 and a boss 43 fixed to the yoke 32. The beveled pinion 42 meshes with the beveled teeth of a beveled spur pinion 44 that is rotatably mounted on a pintle projecting laterally from the boss 43. The spur teeth of the beveled spur pinion 44 mesh with the teeth of a rack 45. The rack 45 has ears 46 and 47 which are bent at right angles to the rack at its upper and lower ends and which have round openings to rotatably and slidably receive the vertical shaft 31. Riveted to the lower ear 47 of the rack 45 is a lower pointer 48 which extends laterally below the upper pointer 41, passing through the narrow vertical slit 40 and having its visible end projecting into the slot 22. The pointer 48 being confined between the walls of the slit 40, the rack 45 is prevented from turning about the axis of the shaft 31. Confinement of the upper and lower pointers between the walls of the slit serves also to keep the spur teeth of the beveled spur pinion 44 in mesh with the teeth of the rack 45.

A knob 50 located outside the front wall of the casing 3 and fastened by means of a setscrew to the forwardly extending hub 30 of the beveled pinion 29 serves as a means by which the operator may rotate the vertical shaft 31 and thus move the lower pointer 48 toward or away from the upper pointer 41. The knob 50 is equipped with an index 51 that turns over a percentage indicating dial 52, the marks on the dial being so numbered and located and the lower pointer adjusting mechanism being so proportioned that when the index 51 is in registration with a numbered mark, the lower pointer 47 will be spaced from the upper pointer 41 a distance equal to that apparently traversed by the visible portions of each of the curved lines when loads on the scale platform are increased by the percentage indicated by the index 51 on the percentage dial 52. A resilient friction washer 53 holds the knob 50 and the lower pointer adjusting mechanism against accidental disarrangement.

When the device is to be used in processing hams, a foreman or other authorized person sets the lower pointer 48 at the proper spacing below the upper pointer 41 by turning the knob 50 until the index 51 is in registration with the mark on the dial 52 having a number corresponding to the percentage of weight to be added in treating the ham. The workman then places a ham on the scale platform and moves the handle 39 until the upper pointer 41 is in registration with the upper visible portion of the line on the disk 16. Then he injects brine into the ham until the weight has increased sufficiently to bring the visible portion of that same line into registration with the lower pointer 48. Each ham in the lot is treated in like manenr, the workman having only to place the ham on the scale, move the handle 39 to bring the upper pointer to the upper line and inject treating fluid until the line descends to the lower pointer.

It should be understood that the visible portions of each of the curved lines 19, 20 and 21 intersect an imaginary vertical line through the tips of the pointers 41 and 48 and that each of the curved lines is so shaped that its point of intersection with such imaginary vertical line moves downwardly the same distance whenever a load on the scale is increased by a given percentage. As the pointer tips are adjustable along the imaginary line, this line will be referred to in the claims as the line of adjustment of the pointer tips. Because of the shortness of the visible segments, neither the curvature nor the angular movement of the curves is noticeable. The visible segments look like short, straight marks moving downwardly in the slot 22. The workman merely moves the upper pointer to the upper mark and then sees that mark descend to the lower pointer.

In order that the visible portions of the curved lines 19, 20 and 21 may be conspicuous the lines are made heavy, and in order that they may register exactly with the tips of the pointers 41 and 48 their vertical widths where they pass the pointers are the same as the widths of the pointer tips. The pointer tips always lie in their line of adjustment, the pointer ends being bent backwardly to bring the tips and their line of adjustment very close to the surface of the disk 16 so that the visible segments of the curves will substantially intersect the line of adjustment of the pointer tips.

For convenience in balancing the scale at zero, one or more straight lines 55 may be so inscribed upon the disk 16 as to lie along the line of adjustment of the pointer tips when the load-counterbalancing mechanism is in proper zero position.

To prevent dirt and moisture from entering the casing through the slot 22 and around the trough-shaped member 26, the opening in the casing before the trough-shaped member is covered by a glass window 56.

The embodiment of our invention herein shown and described is to be regarded as illustrative only, and it is to be understood that the invention is susceptible to variation, modification and change within the spirit and scope of the subjoined claims.

Having described our invention, we claim:

1. In a device of the class described, in combination, a casing, automatic load-counterbalancing mechanism mounted within said casing, a movable chart within said casing, the major part of said chart being masked and a strip of said chart behind a narrow slot being visible from outside said casing, means operated by said load-counterbalancing mechanism for moving said chart, said chart bearing curved lines, short segments of which curved lines are visible through said slot when said load-counterbalancing mechanism is under load, said curved lines being so shaped that the positions at which segments are visible through said slot change through equal distances along said slot when loads on said load-counterbalancing mechanism are increased by equal percentages, a pair of spaced pointers projecting over the visible strip of said chart, means including a handle located exteriorly of said casing for simultaneously moving said pointers along said slot, means including a handle located exteriorly of said casing for adjusting the spacing between said pointers to accord to the extent of change in positions at which segments of said lines are visible when such loads are changed by various predetermined percentages, and means for indicating the percentage of change in weight with which the adjusted spacing of said pointers is to accord.

2. In a device of the class described, in combination, a casing, automatic load-counterbalancing mechanism mounted within said casing, a movable chart within said casing, the major part of said chart being masked and a strip of said chart behind a narrow slot being visible from the exterior of said casing, means operated by said automatic load-counterbalancing mechanism for moving said chart, said chart bearing curved lines, short segments of which curved lines are visible through said slot when said load-counterbalancing mechanism is under load, said curved lines being so shaped that the positions at which segments are visible through said slot change through equal distances along said slot when loads on said load-counterbalancing mechanism are increased by equal percentages, a pair of spaced pointers projecting over the visible strip of said chart, means including a handle located exteriorly of said casing for simultaneously moving said pointers along said slot, and means including a handle located exteriorly of said casing for adjusting the spacing between said pointers to accord to the extent of change in positions at which segments of said lines are visible when loads are changed by various predetermined percentages.

3. In a device of the class described, in combination, a casing, automatic load-counterbalancing mechanism mounted within said casing, a movable chart mounted within said casing, the major part of said chart being masked and a strip of said chart behind a narrow slot being visible from the exterior of said casing, means operated by said load-counterbalancing mechanism for moving said chart, said chart bearing curved lines, short segments of which curved lines are visible through said slot when said load-counterbalancing mechanism is under load, said curved lines being so shaped that the positions at which segments are visible through said slot change through equal distances along said slot when loads on said load-counterbalancing mechanism are increased by equal percentages, a pair of spaced pointers projecting over the visible strip of said chart, means for adjusting the spacing of said pointers, means for simultaneously moving said pointers along said slot, and means for indicating the percentage of change in weight with which the adjusted spacing of said pointers is to accord.

4. In a device of the class described, in combination, a casing, automatic load-couterbalancing mechanism mounted within said casing, a movable chart within said casing, the major part of said chart being masked and a strip of said chart behind a narrow slot being visible from the exterior of said casing, means operated by said automatic load-counterbalancing mechanism for moving said chart, said chart bearing curved lines, short segments of which curved lines are visible through said slot when said load-counterbalancing mechanism is under load, said curved lines being so shaped that the positions at which segments are visible through said slot change through equal distances along said slot when loads on said load-counterbalancing mechanism are increased by equal percentages, a pair of spaced pointers projecting over the visible strip of said chart, means for simultaneously moving said pointers along said slot, and means for adjusting the spacing between said pointers to accord to the extent of change in positions at which segments of said lines are visible when such loads are changed by various predetermined percentages.

5. In a device of the class described, in combination, a casing, automatic load-counterbalancing mechanism mounted within said casing, a movable chart within said casing, the major part of said chart being masked and a strip of said chart behind a narrow slot being visible from the exterior of said casing, means operated by said load-counterbalancing mechanism for moving said chart, said chart bearing curved lines, short segments of which curved lines are visible through said slot when said load-counterbalancing mechanism is under load, said curved lines being so shaped that the positions at which segments are visible through said slot change through equal distances along said slot when loads on said load-counterbalancing mechanism are increased by equal percentages, a pair of spaced pointers projecting over the visible strip of said chart, and means for simultaneously moving said pointers along said slot.

6. In a device of the class described, in combination, a frame, a pair of pointers mounted upon said frame, means for simultaneously adjusting the tips of said pair of pointers along a straight line through their tips, automatic load-counterbalancing mechanism, a chart connected to said automatic load-counterbalancing mechanism to be moved in accordance with loads counterbalanced thereby, said chart bearing a curve located to substantially intersect the line of adjustment through the tips of said pointers when said load-counterbalancing mechanism is under load, said curve being so shaped that such intersection moves along the line of adjustment through the tips of said pointers as such load is increased, the extent of movement of the intersection being proportional to the percentage of increase in load, means for separately adjusting the tip of one of said pointers along such line of adjustment, and an indicator for indicating the percentage of increase required to move such intersection for a distance corresponding tot he spacing of said pointer tips.

7. In a device of the class described, in combination, a frame, a pair of pointers mounted upon said frame, means connecting said pair of pointers for simultaneously moving their tips along a line through their tips, automatic load-counterbalancing mechanism, a chart connected to said automatic load-counterbalancing mechanism to be moved in accordance with loads counterbalanced thereby, said chart bearing a plurality of curves located to sequentially substantially intersect the line of adjustment through the tips of said pointers when said load-counterbalancing mechanism is placed under successively greater loads, said curves being so shaped that such intersections move along the line of adjustment through the tips of said pointers as such loads are increased, the extent of movements of the intersections being proportional to the percentages of increase in load, and a mask hiding the major portions of said curves and having a slot along the line of adjustment through the tips of said pointers, short segments of said curves being visible through said slot.

8. In a device of the class described, in combination, a frame, a pair of pointers mounted upon said frame, means connecting said pair of pointers for simultaneously moving their tips along a line through their tips, automatic load-counterbalancing mechanism, a chart connected to said automatic load-counterbalancing mechanism to be moved in accordance with loads counterbalanced thereby, said chart bearing a curve located to substantially intersect the line of adjustment through the tips of said pointers when said load-counterbalancing mechanism is under load, said curve being so shaped that such intersection moves along the line of adjustment through the tips of said pointers as such load is increased, the extent of movement of the intersection being proportional to the percentage of increase in load, means for separately adjusting the tip of one pointer along such line of adjustment, and a mask for hiding the major portion of said curve and having a slot along the line of adjustment through the tips of said pointers, short segments of said curve being visible through said slot.

9. In a device of the class described, in combination, a frame, a pair of pointers mounted upon said frame, means connecting said pair of pointers for simultaneously moving their tips along a line through their tips, automatic load-counterbalancing mechanism, a chart connected to said automatic load-counterbalancing mechanism to be moved in accordance with loads counterbalanced thereby, said chart bearing a curve located to substantially intersect the line of adjustment through the tips of said pointers when said load-counterbalancing mechanism is under load, said curve being so shaped that such intersection moves along the line of adjustment through the tips of said pointers as such load is increased, the extent of movement of the intersection being proportional to the percentage of increase in load, and a mask hiding the major portion of said curve and having a slot along the line of adjustment of said pointer tips, short segments of said curve being visible through said slot.

10. In a device of the class described, in combination, a frame, a pair of pointers mounted upon said frame, means connecting said pair of pointers for simultaneously moving their tips along a line through their tips, automatic load-counterbalancing mechanism, a chart connected to said automatic load-counterbalancing mechanism to be moved in accordance with loads counterbalanced thereby, said chart bearing a curve located to substantially intersect the line of adjustment through the tips of said pointers when said load-counterbalancing mechanism is under load, said curve being so shaped that such intersection moves along the line of adjustment through the tips of said pointers as such load is increased, the extent of movement of the intersection being proportional to the percentage of increase in load, and means for separately adjusting the tip of one of said pointers along such line of adjustment.

CHARLES O. MARSHALL.
LAWRENCE S. WILLIAMS.